United States Patent [19]

Lindstrom

[11] 3,955,324

[45] May 11, 1976

[54] AGGLOMERATES OF METAL-COATED DIAMONDS IN A CONTINUOUS SYNTHETIC RESINOUS PHASE

[76] Inventor: Olle B. Lindstrom, Lorensviksvagen 14, Vigbyholm, S-183 63 Taby, Sweden

[22] Filed: Dec. 11, 1973

[21] Appl. No.: 423,775

Related U.S. Application Data

[63] Continuation of Ser. No. 875,405, Oct. 10, 1965, abandoned.

[52] U.S. Cl. ............................. 51/298 R; 51/309 R
[51] Int. Cl.² .......................................... C09K 3/14
[58] Field of Search ............. 51/298, 299, 295, 309

[56] References Cited
UNITED STATES PATENTS

| | | | |
|---|---|---|---|
| 2,194,472 | 3/1940 | Jackson | 51/298.1 |
| 2,216,728 | 10/1940 | Benner et al. | 51/298 |
| 2,740,725 | 4/1956 | Ball | 51/298.1 |
| 3,048,482 | 8/1962 | Hurst | 51/298 |

Primary Examiner—Donald J. Arnold
Attorney, Agent, or Firm—Burns, Doane, Swecker & Mathis

[57] ABSTRACT

A grinding tool having a plurality of distinct abrasive particles embedded in a synthetic resin. Each of the abrasive particles has a plurality of abrading grains which are embedded in a metal phase with a metallic layer separating and binding adjacent surfaces of the grains. Each individual grain is thus kept in a metallic setting which is structurally reinforced by the other grains present in the particle with the metal phase between adjacent grain surfaces producing a certain elasticity.

13 Claims, 2 Drawing Figures

INVENTOR:
OLLE B. LINDSTROM

BY Burns, Doane, Benedict,
Swecker & Mathis

ATTORNEYS

AGGLOMERATES OF METAL-COATED DIAMONDS IN A CONTINUOUS SYNTHETIC RESINOUS PHASE

This application is a continuation of application Ser. No. 875,405 filed Oct. 10, 1965, and now abandoned.

BACKGROUND OF THE INVENTION

The present invention relates to tools (such as grinding disks and saws) with abrasive particles containing abrading grains and to a method of manufacturing such grinding tools. More specifically, the present invention relates to tools wherein at least a portion of the abrading grains are diamonds.

The diamond is the hardest material in nature and has found widespread use as an active component of grinding disks. A comprehensive discussion of the use of diamonds in grinding tools may be found in Kirk-Othmer, *Encyclopedia of Chemical Technology* (2d Ed.), Vol. 1, pages 26, 28, 31–33, 37 and 38; and Vol. 4, pages 293 and 301. As shown therein, the bonding agent for the diamonds can be a resin (resin bonded wheels) or metal (metal bonded wheels).

In addition to the conventional resin and metal bonded wheels, it has been found advantageous to prepare resin bonded wheels with the individual diamonds having a metal coating. Resin bonded diamond grinding wheels with metal coated diamonds show better durability than wheels with uncoated diamonds. This is apparently due, in part, to the fact that the thermal stresses at the interface between the metal coated diamond and the resin phase are decreased. In addition, uncoated diamonds tend to crack after prolonged grinding and come loose from the disk. The metal coating, on the other hand, retains the diamond splinters so that more of the diamond is utilized for grinding work than would otherwise be possible with uncoated diamonds.

SUMMARY OF THE INVENTION

Grinding tools according to the present invention are similar to conventional resin bonded wheels with metal coated diamonds in that they contain the same three material components of prior art, namely diamond, metal and resin. These three materials have, however, been disposed in a new manner. In the grinding tool according to the present invention, the abrasive particles are made up of at least two abrading grains which are separated from each other by a metal layer into which these abrading grains are bonded. The abrasive particles are, in turn, embedded in the resin bond of the wheel so that each abrading particle is separated from adjoining abrading particles by the resin. The abrasive particles of the present invention represent a new kind of abrasive particle which is structurally different from particles of prior art patent (for example, U.S. Pat. No. 2,216,728 to Benner and Ball) which has described abrasive particles consisting of an extremely dense structure of a cluster of an abrasive grain in direct close contact, with the space between the grains filled with a binder. Benner et al use as binders for the aggregates various materials like metals, glass, rubber, etc. The close contact structure produces aggregates with properties similar to those of larger abrasive grains, e.g., diamonds with the same size as the aggregate. The binder thus keeps the aggregate together but has no influence on the critical contact points between the granules as with the aggregate discribed by Benner et al. On the contrary, particles of the present invention exhibit a much less dense structure than the particles described in U.S. Pat. No. 2,216,728, since each individual grain is separated from the others by a metal layer. Therefore, particles of the present invention exhibit mechanical properties of a metal particle whereas the mechanical properties of the particles described in the aforesaid patent more nearly resemble those of a large, single abrading grain. In a somewhat simplified way, the abrasive particles of the prior art may be characterized as aggregates where each grain is kept in a setting with its neighbor grains by a hard, brittle binder, the specific material of the binder being immaterial, whereas the abrasive particle of the present invention contains brading grains that are kept in a metal setting which gives the particle the property of being elastic and wherein the abrasive particle is structurally reinforced by the other grains present in the particle. The presence of metal in the critical near contact points gives an abrasive particle increased resistance to breaking due to shock loading, and also reduces the likelihood of damage to the abrasive particle due to thermal spikes.

DESCRIPTION OF THE PREFERRED EMBODIMENT

Figure 1:
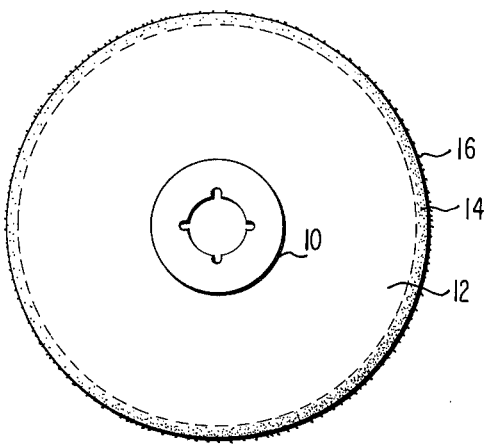
FIG. 1 is an illustrative view of a grinding wheel.

Turning now to FIG. 1, there is shown a diagrammatic view of a grinding wheel. Throughout the present description, reference will be made to grinding wheels with the understanding that the present invention applies equally to other types of metal working tools such as files, saws and the like.

The grinding wheel as illustrated in FIG. 1 includes a central element such as a metal hub 10 which is suitably matched for mounting the grinding wheel on appropriate grinding machinery. The wheel itself includes an inactive part 12 and an active part 14. The active part 14 has embedded therein at least one layer of abrasive particles 16.

Figure 2:
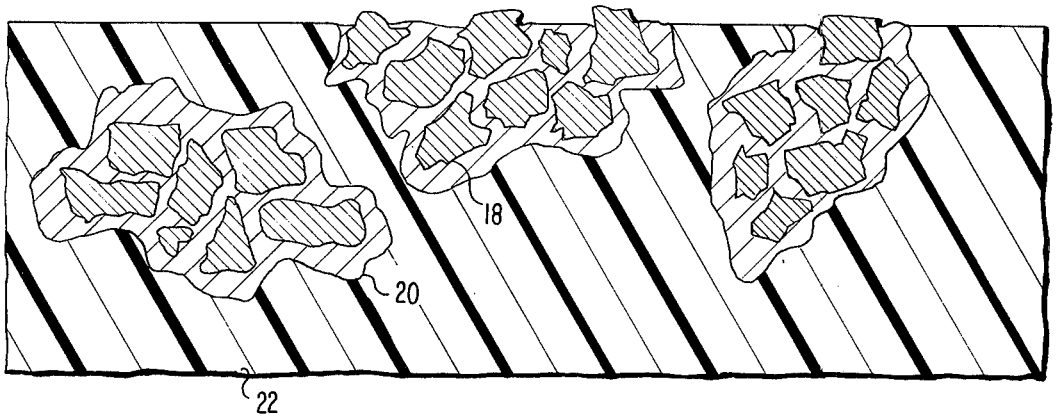
FIG. 2 is a cross-sectional view of the active part of the grinding wheel of FIG. 1.

FIG. 2 is a cross-sectional view of the active part 14 of the grinding wheel of FIG. 1. As illustrated therein, the active part 14 includes a plurality of abrading grains, exemplified by the diamonds 18, which are disposed in abrasive particles 20 which are, in turn, disposed in a continuous plastic phase 22. An abrasive particle such as the metal particle 20 is defined herein as having enclosed and adjacent but mutually separated abrading grains 18, at least one of which is a diamond. The precise structure of the abrasive particle will, of course, vary from application to application. In some instances, it will be desirable to provide abrasive particles wherein all of the abrading grains are diamonds. In others, some of the diamonds will be replaced by other types of abrasive material such as abrading grains of silicon carbide or metallic oxides which preferably have approximately the same size and shape as the diamonds.

As can be seen from FIG. 2, the composite structure according to the invention can be regarded as a hybrid between the structure of the present metal bonded wheel and the structure of the prior art resin bonded wheel. In another "hybrid" structure, i.e., resin bonded grinding wheels with metal coated single diamonds, it will be noted that there is a substantially uniform distribution of the diamonds. Each single diamond is always separated by a synthetic resin phase in addition to the metal layer on the diamond. Each diamond is on a pair with all others from a structural point of view. In wheels according to the present invention, adjacent diamonds are separated only by a metallic phase. The abrasive particles are in turn separated only by the synthetic resin phase so that only those diamonds that exist in the same abrasive particle can be regarded as being on a par from a structural point of view.

Grinding tools according to the invention have substantially better qualities than either the resin or the metal bonded disk. This improvement was not predictable from available knowledge about the characteristics of the previously known grinding wheel types, and is achieved primarily because of the difference in structure referred to above and illustrated in FIG. 2.

One reason for the improved performance of grinding tools according to the present invention resides in the fact that the abrading grains included in an abrasive particle have a reinforcing and strengthening effect on the abrasive particle. Because the abrading grains in abrasive particle are totally surrounded by a metal layer and the facing surfaces of the adjacent grains are not in contact, the adjacent grains have a locking effect on each other. This mechanical interaction between the abrading grains is, of course, not possible in grinding tools of the prior art which use individual (coated or uncoated) abrading grains, or with the multiple grain abrasive particles in the Benner et al. U.S. Pat. No. 2,216,728 because weakened regions occur at the facing edges or surfaces that are placed in contact with each other when the mixture of diamond grains and metal is pressed together for heating to the melting point of the metal.

In order to make maximum use of the above-cited advantages, the relative amounts of metal and diamonds should be established so as to retain the mutually reinforcing effect while retaining a certain elasticity within the abrasive particles. When an individual grain in the abrasive particle is subjected to fracture during grinding, this fracture will be limited to this particular grain and the splinters will be kept in place by the surrounding metal phase which in its turn is reinforced by the other grains in the abrasive particle of the present invention. Particles of the prior art, e.g., as described in the Benner et al patent, will in general break up entirely in a similar situation starting with the initial fracture. In the latter case, the burden of keeping the splinters of the fractured entire particle in place as long as possible is put on the interaggregate, e.g., resin bond.

In establishing the ratio between metal and diamonds, it is first necessary to provide sufficient metal so as to assure that direct contact between the diamonds in the abrasive particle does not take place. The easiest way to assure that the diamonds or other abrading grains in an abrasive particle rarely have direct contact is to first coat such grains with a thin layer of metal as discussed below. It may not always be possible to avoid such contact entirely. For example, if exceptional direct contact between one grain and any of the adjacent grains in particles of the present invention takes place at a frequency of 5%, then there is also a chance of 5% that the second contacted particle will be in direct contact with a third particle. The probability that three grains will be in direct contact in the same particle is thus $0.05 \times 0.05 = 0.25\%$. In accord with the present invention, the effect of undesired infrequent contact will be of extremely small significance for particles with well developed composite structures having several grains in the abrasive particle whereas following the procedure disclosed in Example 1 in the Benner et al patent, the high frequency of contact between abrading grains in the abrasive particles will contribute importantly to the brittleness of this type of abrading particle.

The mutually reinforcing effect of the abrading grains of the present invention will be enhanced if the metallic bond between adjacent diamond surfaces falls within the range of $10^{-4}$ to $10^{-2}$ mm. A thinner layer than $10^{-4}$ mm would merely produce a kind of wetting effect which occurs with a monomolecular layer having a thickness on the order of $10^{-6}$ mm. Such thin metal layers which produce merely wetting cannot give the desired thermal and elastic properties or the mechanical strength that is formed in the abrasive particles of the present invention. Thermal spikes during grinding thus may easily melt down the thin, wetting type of layers separating the grains.

It is also advantageous to use relatively small diamonds in the abrasive particles so that the number of cutting surfaces increases. With a grinding tool constructed in this fashion, the cutting speed can be kept high without a corresponding increase in the thermal stresses on the plastic phase.

The preceding is an attempt to offer a technical explanation of the factors contributing to the advantages of the present invention. The various interrelated conditions are very complicated, however, and what has been said above concerning mechanisms of action, etc., is to be regarded only as suggested explanations. In addition, it should be pointed out that while the preceding discussion has exemplified the present invention by reference to diamond grinding wheels, the reasoning is equally valid for other embodiments of the invention.

Having set forth above the essential characteristics of the present invention, attention will now be paid to specific structures including particularly advantageous component sizes and ratios.

Diamonds that are generally used in grinding wheels fall within the range of magnitude of 0.007 – 1.190 mm, as measured in the longest tip-to-tip direction. The range of 0.037 – 0.350 mm is often used. The present invention can be adapted for abrading grains of the above sizes but use of diamonds within the range of 0.074 – 0.177 mm has been found to be particularly advantageous. Results with diamonds in the middle of this range, i.e., approximately 0.100 mm, have been particularly favorable.

The metal/diamond volume ratio for an abrasive particle can be varied within relatively wide limits. It has, however, been found particularly advantageous to establish the ratio between the volume of the metal and the volume of the diamonds within the range from 1:4 to 20:1. An especially advantageous metal/diamond volume ratio is within the range from 1:2 to 1:1.

The size of the abrasive particles according to the present invention can also be varied within wide limits, from 0.015 to 5 mm and larger as measured in the longest tip-to-tip direction, depending upon the particular application. A preferred range for grinding wheels is 0.2 – 1 mm. The number of abrading grains in an abrasive particle is determined by a number of factors including the optimum abrading grain size and the optimum size of the abrasive particle. With particularly small diamonds having a diameter of approximately 0.007 mm, the number of abrading grains in a particle can approach 50 or more. With larger diamonds of about 0.07 mm diameter, it is preferable to dispose 3 – 10 diamonds in each abrasive particle. About 5 abrading grains for each abrasive particle has been found to be a reasonable average.

The ratio between the volume of the abrasive particles and the bonding resin phase (including various additions to the resin phase) can be varied within wide limits, all depending on the particular application. In the active part of the disk, the ratio between the volume of the plastic phase and the volume of the abrasive particles can fall between 1:3 to 20:1. A volume ratio of about 1:1 is often especially advantageous.

Since the special composite structure is the essential characteristic of the present invention, the advantages of this invention are not critically dependent upon the composition of the metal phase, the resin phase or the abrading grains. Certain general characteristics are, however, desirable.

The metal phase should have good heat conducting ability, strength and elasticity. Metals used as construction material, particularly those used in metal bonded wheels, can be used alone or alloyed with each other. It has been found advantageous to use such metals as nickel, copper, cobalt, and silver or alloys thereof. The metal phase of the abrasive particle can be built up by casting, sintering, electrodeposition, vaporization, or combinations of these processes. The metal phase can be either a homogenous composition such as nickel or may also contain metal grains that have been enclosed in the continuous phase by casting, etc., as specified in detail hereinafter.

Polymer materials which are generally used for resin bonded diamond grinding disks are also suitable for grinding wheels according to the invention. Such materials include epoxy resins, carbamide resins, phenol resins and polyester plastics which may be reinforced by metal or glass fiber. It is also advantageous to mix in other filler or additive materials such as silicon carbide, calcium oxide, etc. An example of a suitable resin compound is a phenol resin with the addition of 60% silicon carbide and 1.2% calcium oxide hardened with 38.8% of a commercial hardening agent at 160°C. for 20 minutes, and after-hardened at 150°C. for 24 hours. Silicon carbide is a well known additive in the grinding wheel technology, being used in much smaller particle sizes than the abrading grains. Frequently, a particle size corresponding to 600 mesh U.S. scale is used. Calcium oxide is a non-abrasive chemical for the hardening process. Phenol resins are well known and are not a part of the present invention per se. See generally Golding, *Polymers and Resins* (D. Van Nostrant 1959), U.S. Pat. Nos. 3,269,813 to Kibbey; and 3,246,970 to Zimmerman; and Kirk-Othmer *Encyclopedia of Chemical Technology* (2d Ed.) Vol. 8, p. 294; Vol. 15, p. 176.

The individual abrasive particles can be produced by mechanically breaking (e.g., crushing and/or grinding) larger bodies that have been produced by any of several methods used in the preparation of conventional metal bonded disks. Abrasive particles of suitable shape and size are then sorted out, for example, by screening. Unaccepted material can suitably be returned to the earlier steps of the preparation process.

One example of a method for the preparation of such bodies is the following die-casting process. The mold is advantageously made of an aluminum alloy containing copper and magnesium as the primary alloying elements together with smaller amounts of iron, nickel, and titanium.

The abrading grains are initially mixed with a metallic filler. The metallic filler may comprise, for example, a mixture of chips of the same composition as the mold. These filler chips are then mixed with powdered antimony with the same volume ratio between the chips and the antimony being preferably 2:1. The metallic filler is screened to a size corresponding to the grain size of the diamonds so that the diamonds can be distributed uniformly throughout the entire mixture.

The die-casting alloy (or "carrier") preferably comprises about 65% of a conventional die-casting zinc alloy which contains copper and aluminum as the principal alloying elements and includes about 32% cadmium and 3% commercial silver. The primary requirement for the die-casting alloy is a melting point which is lower than the melting point of the metallic filler. It will, therefore, be apparent that other diecasting alloys which meet the required melting point conditions can be used.

The mixture of diamonds (and optionally other abrading grains) and the metallic filler material is then introduced into the mold. This mixture, which has been prepared by tumbling, can be uniformly dispersed into the mold by rotating the mold. After this rather loosely packed mixture has been evenly distributed within the mold, the mold is introduced into a die-casting machine wherein the molten die-casting metal is added so as to fill in the pores between the diamonds and the filler material. The aggregate is then cooled and the mold removed.

The bodies formed in this manner are then crushed so as to produce abrasive particles of the desired shape and size for casting into a grinding tool.

Methods of powder metallurgy can also be used to advantage. It is, for example, suitable to hot-press a mixture of nickel powder and diamonds that are individually nickel coated in a known manner into continuous bodies which subsequently can be further processed into abrasive particles. Individually metal coated diamonds can also be die-cast into continuous bodies which can subsequently be further processed.

Galvanic methods which have been used for the preparation of individually metal coated diamonds may also be used. The individual diamonds are provided with a thin metal layer and are then agglomerated into cohesive particles which are subsequently provided with a metal bond by the galvanic method. It is, however, desirable to work with low current density so that the metal will be deposited in the pores that are present between the abrading grains in the agglomerate. Galvanic metal deposition may also be used as the final treatment for abrasive particles produced by the above-mentioned process.

It is also possible that larger abrasive particles can be made directly in the desired size and shape by various casting and powder-metallurgical methods, thereby eliminating the mechanical crushing step. In all methods, however, the abrading grains are first individually coated before being further processed to fill the void spaces between the grains. Such a procedure gives the abrasive particle the properties of strength and elasticity, as opposed to tthe brittleness provided by the method taught in the Benner, et al U.S. Pat. No. 2,216,728. In addition, by use of a metal with good heat conducting properties, the localized heating caused by thermal spikes is distributed over a larger area and reduces the likelihood that an abrasive particle will fall out of the resin matrix.

The invention may be embodied in other specific forms without departing from the spirit or essential characteristics thereof. The present embodiments, therefore, are to be considered in all respects as illustrative and not restrictive, the scope of the invention being indicated by the appended claims, rather than by the foregoing description, and all changes which come within the meaning and range of equivalency of the claims and therefore intended to be embraced therein.

I claim:

1. A grinding tool having an inactive part and an active part, said active part comprising a synthetic resin material having properties suitable for grinding tools in which a layer of distinct abrasive particles are embedded, each of said abrasive particles when not exposed through said surface layer being completely surrounded by said plastic resin and consisting solely of a binder of a metal possessing good heat conducting ability, strength and elasticity properties and at least two abrading grains embedded therein, wherein at least one abrading grain is a diamond and wherein each abrading grain when not exposed through said surface layer is completely surrounded by said metal binder, wherein:

the ratio of the volume of the metal to the volume of the abrading grains in the abrasive particles falls within the range of from 1:4 to 20:1, the ratio of the volume of said abrasive particles to the volume of said resin falls within the range of from 1:3 to 20:1, the abrading grains are of a size as measured in the longest tip-to-tip direction that falls within the range of from 0.037 mm to 0.350 mm, and the abrasive particles are of a size as measured in the longest tip-to-tip direction that falls within the range of from 0.2 mm to 1 mm.

2. A grinding tool having an inactive part and an active part; said active part comprising a synthetic resin material having properties suitable for grinding tools in which abrasive particles are embedded; each of said abrasive particles when not exposed on the surface of said resin material being completely surrounded by said resin material; said abrasive particles each comprising a binder of a metal possessing good heat conducting ability, strength and elasticity properties and several diamonds having maximum tip-to-tip dimensions in the range of between about 0.037 mm to 0.350 mm with the thickness of said metal binder separating adjacent diamonds by a distance between 0.0001 and 0.01 mm, said metal being present in a quantity to give the abrasive particle the property of being elastic and completely surrounding each diamond when not exposed through said surface layer to avoid direct contact between the diamonds and the resin material.

3. A grinding tool having an inactive part and an active part, said active part comprising a synthetic resin containing embedded therein a surface layer of distinct abrasive particles, each of said abrasive particles when not exposed through said surface layer being completely surrounded by said resin and comprising at least two abrading grains embedded in a metallic phase with a metallic separating and binding layer between the adjacent surfaces of the grains wherein at least one of said abrading grains is a diamond and the ratio of the volume of the metal forming the metallic phase to the volume of the abrading grains in the abrasive particles falls within the range of from 1:4 to 5:1.

4. The grinding tool recited in claim 3 wherein the ratio of the volume of said abrasive particles to the volume of said active part falls within the range of from 1:3 to 20:1.

5. The grinding tool recited in claim 4 wherein the abrading grains in the abrasive particles consist of diamonds of a size as measured in the longest tip-to-tip direction that falls within the range of from 0.037 mm to 0.350 mm, and the metallic separating and binding layer between facing surfaces of adjacent grains is between about 0.0001 mm and 0.01 mm.

6. The grinding tool recited in claim 5 wherein the metal in the abrasive particles substantially comprises nickel and the synthetic resin comprises a hardened phenol resin.

7. The grinding tool recited in claim 6 further comprising a central section for mounting said active and inactive parts.

8. In a grinding tool having an inactive part and an active part, the active part comprising a synthetic resin material having abrasive particles embedded therein, the abrasive particles each comprising a plurality of diamond abrasive grains and a metal binder, the improvement which reduces thermal spikes in said grinding tool which comprises utilizing as said diamond abrasive grains in the said abrasive particles, diamond grains which are each completely coated with a metal layer whereby direct contact between the diamond grains and the synthetic resin material is avoided, the volume ratio of metal to diamonds in the abrasive particles being from about 1:4 to 20:1.

9. The improved grinding tool of claim 8 wherein the abrasive particles are formed by first coating the individual diamond grains with a metal layer, forming the metal-coated diamonds in a continuous body and adding further metal to fill any pores in the body.

10. The improved grinding tool of claim 9 wherein said abrasive particles are formed by hot pressing a mixture of said metal coated diamonds and metal powders.

11. The improved grinding tool of claim 9 wherein the metal between adjacent diamond grains in the abrasive particles is from about $10^{-4}$ to $10^{-2}$ mm. in thickness.

12. The improved grinding tool of claim 8 wherein the diamond grains have a size of from about 0.007 to 1.190 mm. measured in the longest tip-to-tip direction.

13. The improved grinding tool of claim 12 wherein the abrasive particles have a size of from about 0.015 to 5 mm. measured in the longest tip-to-tip direction.

* * * * *